United States Patent
Okuhata

(10) Patent No.: US 11,394,275 B2
(45) Date of Patent: Jul. 19, 2022

(54) MOTOR UNIT

(71) Applicant: NIDEC TOSOK CORPORATION, Kanagawa (JP)

(72) Inventor: Yoshihisa Okuhata, Kanagawa (JP)

(73) Assignee: NIDEC TOSOK CORPORATION, Kanagawa (JP)

( * ) Notice: Subject to any disclaimer, the term of this patent is extended or adjusted under 35 U.S.C. 154(b) by 364 days.

(21) Appl. No.: 16/581,762

(22) Filed: Sep. 25, 2019

(65) Prior Publication Data

US 2020/0106343 A1 Apr. 2, 2020

(30) Foreign Application Priority Data

Sep. 28, 2018 (JP) .............................. JP2018-184480

(51) Int. Cl.
*H02K 9/19* (2006.01)
*H02K 9/193* (2006.01)
*H02K 11/33* (2016.01)
*H02K 9/26* (2006.01)

(52) U.S. Cl.
CPC ............... *H02K 9/193* (2013.01); *H02K 9/26* (2013.01); *H02K 11/33* (2016.01)

(58) Field of Classification Search
CPC ............ H02K 9/19; H02K 9/193; H02K 9/26; H02K 11/33; H02K 11/00–11/40; H02K 13/00; H02K 5/20; H02K 5/12
See application file for complete search history.

(56) References Cited

U.S. PATENT DOCUMENTS

| 2006/0057003 A1* | 3/2006 | Mitsuda | F04D 13/14 417/423.12 |
| 2010/0251757 A1* | 10/2010 | Hasegawa | F25B 9/008 62/468 |
| 2011/0302954 A1* | 12/2011 | Okaichi | F01C 1/3564 62/468 |

FOREIGN PATENT DOCUMENTS

JP 5911033 4/2016

* cited by examiner

*Primary Examiner* — Quyen P Leung
*Assistant Examiner* — Leda T Pham
(74) *Attorney, Agent, or Firm* — JCIPRNET

(57) ABSTRACT

A motor unit includes a motor having a motor shaft disposed along a central axis which extends in an axial direction, and a cooling unit which cools the motor, wherein the cooling unit includes a first suction port configured to suction a first refrigerant which cools the motor, a first discharge port configured to discharge the first refrigerant suctioned from the first suction port, a second suction port configured to suction a second refrigerant which cools the first refrigerant by exchanging heat with the first refrigerant, and a second discharge port configured to discharge the second refrigerant suctioned from the second suction port.

13 Claims, 6 Drawing Sheets

MOTOR UNIT

CROSS REFERENCE TO RELATED APPLICATIONS

This application claims the priority benefits of Japanese Patent Application No. 2018-184480, filed on Sep. 28, 2018. The entirety of each of the above-mentioned patent applications is hereby incorporated by reference herein and made a part of this specification.

TECHNICAL FIELD

The disclosure relates to a motor unit.

DESCRIPTION OF RELATED ART

Conventionally, a technique for cooling a motor is known. For example, Patent Document 1 (Japanese Patent No. 5911033) discloses a rotary electrical machine which can cool a stator and a rotor at the same time by allowing a coolant to flow to both the stator and the rotor at the same time.

[Patent Document 1] Japanese Patent No. 5911033

Incidentally, an inverter is required to drive the motor. The heat generated by the inverter is significant and cannot be ignored. Therefore, it is desirable to cool the inverter together with the motor.

However, in Japanese Patent No. 5911033, no consideration is given to the cooling of the inverter, and there is a problem that the inverter cannot be cooled. Thus, a configuration in which the inverter is cooled is required separately to cool the inverter, and there is also a problem that a size of the structure which drives the motor may also become large.

SUMMARY

The disclosure provides a motor unit which is able to cool an inverter for driving a motor and has a small size.

According to an aspect of the disclosure, there is provided a motor unit including: a motor having a motor shaft disposed along a central axis which extends in an axial direction, and a cooling unit which cools the motor. The cooling unit includes: a first suction port, configured to suction a first refrigerant which cools the motor; a first discharge port, configured to discharge the first refrigerant suctioned from the first suction port; a second suction port, configured to suction a second refrigerant which cools the first refrigerant by exchanging heat with the first refrigerant; and a second discharge port, configured to discharge the second refrigerant suctioned from the second suction port.

According to an aspect of the disclosure, it is possible to provide a motor unit which is able to cool an inverter for driving a motor and has a small size.

DESCRIPTION OF EMBODIMENTS

Hereinafter, a motor unit according to an embodiment of the disclosure will be described with reference to the drawings. In the embodiment, a motor unit including a traction motor for driving a vehicle will be described, but the disclosure is not limited thereto and can be applied to any motor. Moreover, in the following drawings, in order to make each of configurations easy to understand, an actual structure may be different from the scale and numbers in each of structures.

Figure 1:
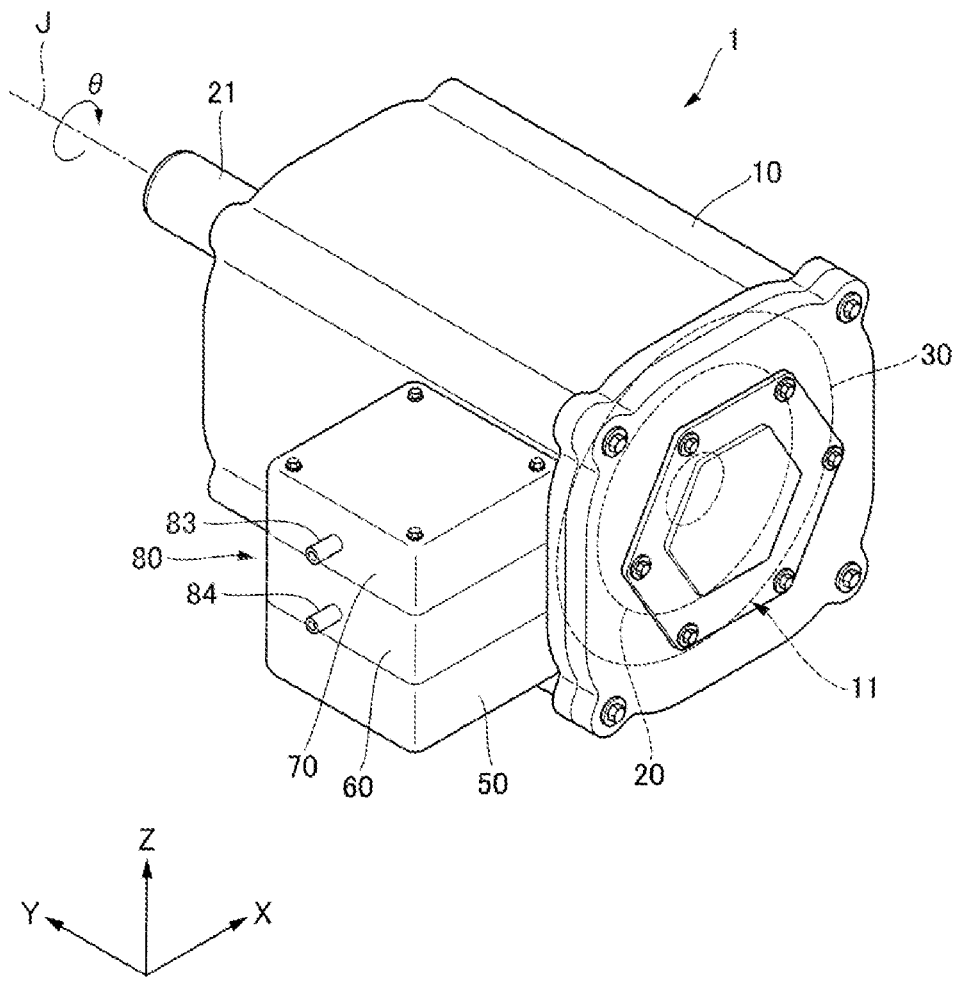
FIG. 1 is a schematic perspective view of a motor unit according to a first embodiment of the disclosure.

Further, in the drawing, an XYZ coordinate system is appropriately shown as a three-dimensional orthogonal coordinate system. In the XYZ coordinate system, a Z-axis direction is a vertical direction Z with the positive side as upward and the negative side as downward as shown in FIG. 1. Further, the positive side in the vertical direction Z is referred to as "one side in the vertical direction," and the negative side of the vertical direction Z is referred to as "the other side in vertical direction." A Y-axis direction is a direction parallel to a central axis J which extends in one direction shown in FIG. 1 and is a direction perpendicular to the vertical direction Z. In the following description, a direction parallel to the central axis J, that is, the Y-axis direction is referred to as "axial direction Y." Further, the positive side in the axial direction Y is referred to as "one side in the axial direction," and the negative side in the axial direction Y is referred to as "the other side in the axial direction." The X-axis direction is a direction orthogonal to both the axial direction Y and the vertical direction Z. In the following description, the X-axis direction is referred to as "width direction X." Furthermore, the positive side in the width direction X is referred to as "one side in the width direction," and the negative side in the width direction X is referred to as "the other side in the width direction." In the embodiment, the vertical direction Z corresponds to a predetermined direction.

Further, a radial direction centered on the central axis J is simply referred to as "radial direction," and a circumferential direction centered on the central axis J is simply referred to as "circumferential direction θ." Also, in the circumferential direction θ, when seen from the other side in the axial direction to the one side in the axial direction, the side which proceeds clockwise, that is, the side in which an arrow indicating the circumferential direction θ in the drawing proceeds is referred to as "one side in the circumferential direction," and the side which proceeds counterclockwise, that is, the side opposite to the side in which the arrow indicating the circumferential direction θ in the drawing proceeds is referred to as "the other side in the circumferential direction."

The vertical direction, the upper side, and the lower side are simply names for explaining a relative positional relationship between the respective parts, and an actual arrangement relationship or the like may be an arrangement relationship or the like other than the arrangement relationship or the like indicated by the names. Further, in this specification, directions such as forward, rearward, right, left, up and down indicate directions seen in the drawings and do not limit directions when a device according to the disclosure is used.

In this specification, the term "extending in the x-axis direction, the Y-axis direction, or the Z-axis direction" includes a case of extending in a direction tilted within a range of less than 45° with respect to the X-axis direction, the Y-axis direction, or the Z-axis direction, in addition to a case of extending in the X-axis direction, the Y-axis direction, or the Z-axis direction strictly.

First Embodiment

<Entire Configuration>

FIG. 1 is a schematic perspective view of a motor unit according to a first embodiment. As shown in FIG. 1, the motor unit 1 of the embodiment includes a housing 10, a motor 11 accommodated in the housing 10, and a cooling unit 80. The cooling unit 80 includes an electric oil pump 50, an oil cooler 60, and an electric water pump 70. A form of each of components is not limited to that shown in FIG. 1. The electric oil pump 50 is a pump which is operated by receiving supply of power (not shown). The electric water pump 70 is a pump which is operated by receiving the supply of power (not shown).

The housing 10 accommodates the motor 11. In the embodiment, the cooling unit 80 is a separate part from the housing 10, but the cooling unit 80 may be in the same part as the housing 10. When the cooling unit 80 and the housing 10 are the same parts, the motor unit 1 can be reduced in size. The cooling unit 80 is mounted on the motor 11. Therefore, a pipe between the motor 11 and the cooling unit 80 can be shortened. Specifically, an oil pipe between the motor 11 and the electric oil pump 50 can be shortened. The cooling unit 80 can cool the motor 11 by circulating oil to the motor 11 with the electric oil pump 50.

The cooling unit 80 may be disposed in the vicinity of a position where a motor driving inverter (not shown) which drives the motor 11 is disposed. Thus, a cooling water pipe between the motor driving inverter and the cooling unit 80 can be shortened. Specifically, a pipe between the motor driving inverter and the electric water pump 70 can be shortened. Cooling water from the motor driving inverter is suctioned into the electric water pump 70 through a second suction port 83 by driving of the electric water pump 70. The cooling water suctioned from the second suction port 83 is discharged from a second discharge port 84 via the electric water pump 70 and the oil cooler 60 by the driving of the electric water pump 70. The cooling unit 80 can cool the motor driving inverter by circulating the cooling water to the motor driving inverter with the electric water pump 70.

In the embodiment, the electric oil pump 50 is provided outward from the housing 10, but the electric oil pump 50 may be provided inside the housing 10. The motor unit 1 can be reduced in size by providing the electric oil pump 50 in the housing 10.

In the embodiment, the oil cooler 60 is provided outward from the housing 10, but the oil cooler 60 may be provided inside the housing 10. The motor unit 1 can be reduced in size by providing the oil cooler 60 in the housing 10.

In the embodiment, the electric water pump 70 is provided outward from the housing 10, but the electric water pump 70 may be provided inside the housing 10. The motor unit 1 can be reduced in size by providing the electric water pump 70 in the housing 10.

The oil cooler 60 is disposed between the electric water pump 70 and the electric oil pump 50. Therefore, an oil pipe between the electric oil pump 50 and the oil cooler 60 and a cooling water pipe between the electric water pump 70 and the oil cooler 60 can be eliminated.

Figure 2:
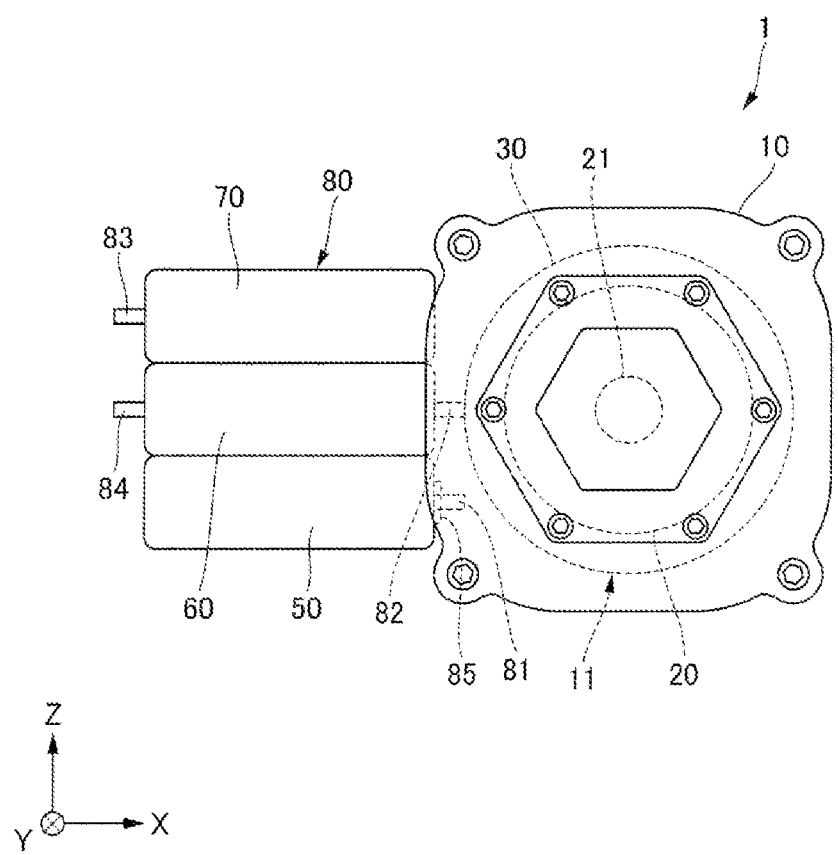
FIG. 2 is a schematic side view of the motor unit of FIG. 1 when seen from the other side in an axial direction.

FIG. 2 is a schematic side view of the motor unit 1 of FIG. 1 when seen from the other side in the axial direction. The motor 11 includes a motor shaft 21 which is disposed along the central axis J which extends in the axial direction, a rotor 20 which is provided outward from the motor shaft 21 in the radial direction and is rotatable together with the motor shaft 21, and a stator 30 which is disposed outward from the rotor 20 in the radial direction with a gap therebetween.

The motor 11 generates heat as it is driven. The electric oil pump 50 supplies oil, which is a refrigerant for cooling the motor 11, to the motor 11. Specifically, due to the driving of the electric oil pump 50, the oil (a first refrigerant) as a refrigerant is circulated through a circulation path (a first flow path) in the electric oil pump 50, the oil cooler 60, and the housing 10. Since the refrigerant circulated by the electric oil pump 50 is the oil, the motor 11 can be cooled while lubrication is performed in driving of the motor 11.

The oil which is a refrigerant for cooling the motor 11 is suctioned into the electric oil pump 50 from the first suction port 81 by the driving of the electric oil pump 50. A filter 85 is provided in the first suction port 81. Although it is assumed that contaminants will be mixed into the oil in the housing 10, the mixing of the contaminants into the electric oil pump 50 can be prevented by providing the filter 85 at the first suction port 81. The oil suctioned from the first suction port 81 is discharged from a first discharge port 82 via the electric oil pump 50 and the oil cooler 60 by the driving of the electric oil pump 50.

The motor driving inverter which drives the motor 11 generates heat as the motor 11 is driven. The electric water pump 70 supplies the cooling water, which is a refrigerant for cooling the motor driving inverter, to the motor driving inverter. Specifically, the cooling water (a second refrigerant) as a refrigerant is circulated through a circulation path (a second flow path) of a radiator (not shown), the motor driving inverter, the electric water pump 70, and the oil cooler 60 by the driving of the electric water pump 70. Since the refrigerant circulated by the electric water pump 70 is for example cooling water, which is a coolant, the motor driving inverter can be efficiently cooled by the cooling water cooled by the radiator. In addition, the cooling water as a refrigerant may be circulated through a circulation path of the radiator (not shown), the electric water pump 70, and the oil cooler 60 by the driving of the electric water pump 70.

The oil cooler 60 is a heat exchanger in which heat exchange between the oil circulated by the electric oil pump 50 and the cooling water circulated by the electric water pump 70 is performed. The radiator is located in the circulation path of the cooling water circulated by the electric water pump 70, and the cooling water is cooled by the radiator. The oil cooler 60 cools the oil circulated by the electric oil pump 50 with the cooling water cooled by the radiator.

The electric oil pump 50 and the electric water pump 70 are electric pumps. Therefore, cooling efficiency can be improved by performing electric driving control.

Second Embodiment

<Entire Configuration>

Figure 3:
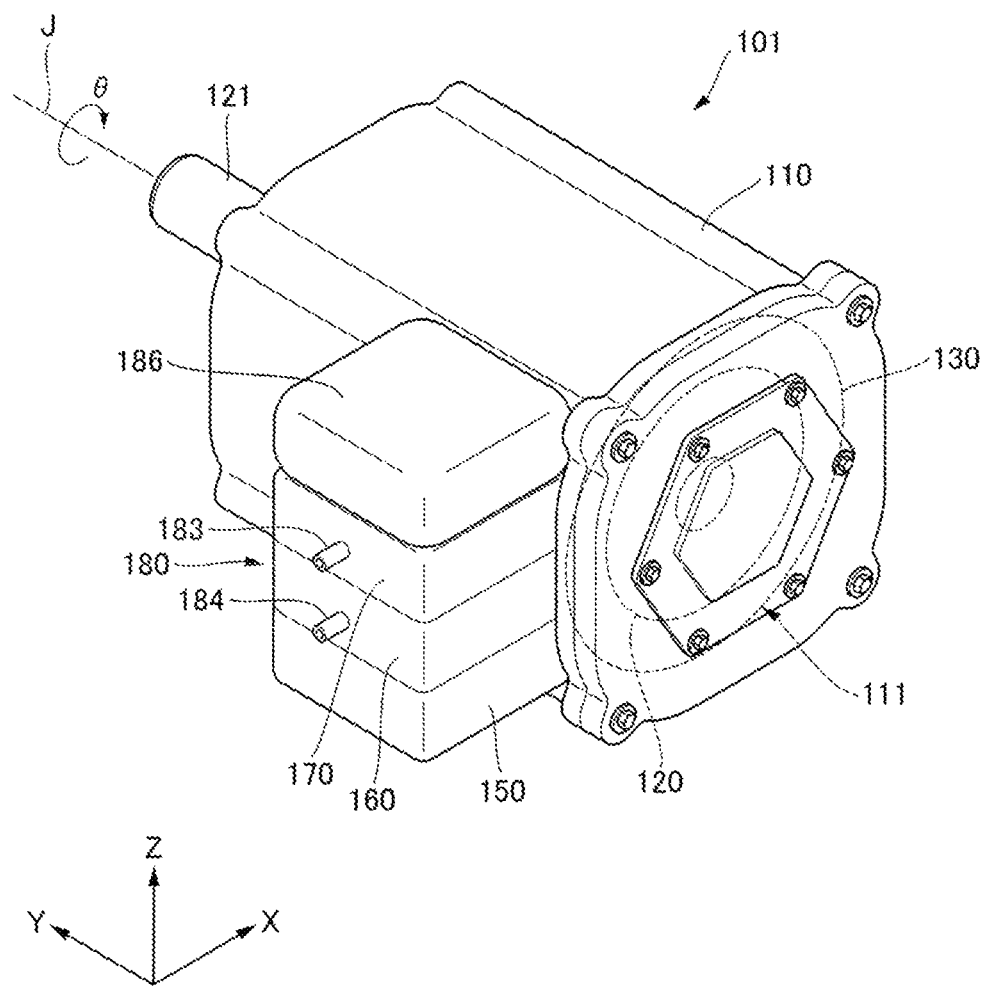
FIG. 3 is a schematic perspective view of a motor unit according to a second embodiment.
Figure 4:
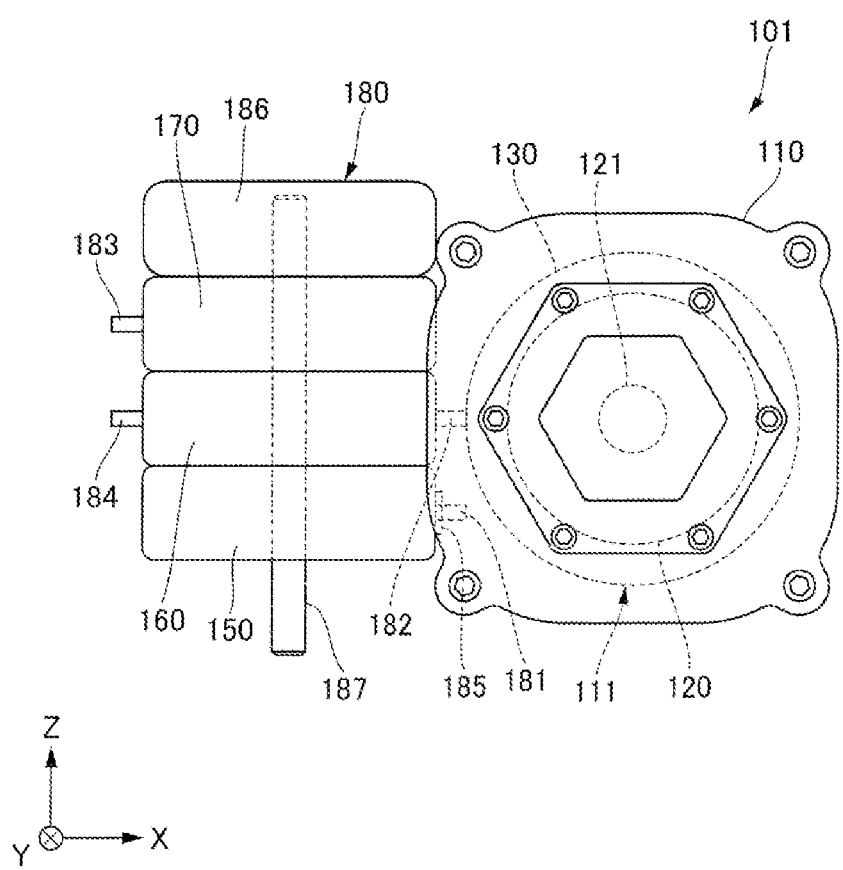
FIG. 4 is a schematic side view of the motor unit of FIG. 3 when seen from the other side in an axial direction.

FIG. 3 is a schematic perspective view of a motor unit according to a second embodiment. FIG. 4 is a schematic side view of the motor unit 101 of FIG. 3 when seen from the other side in the axial direction. The motor unit 101 of the embodiment includes a housing 110, a motor 111 accommodated in the housing 110, and a cooling unit 180. The cooling unit 180 includes an oil pump 150, an oil cooler 160, a water pump 170, and a pump motor 186. A form of each of components is not limited to that shown in FIG. 3. The oil pump 150 is a pump which is operated by rotation of the pump motor 186. The water pump 170 is a pump which is operated by rotation of the pump motor 186.

A configuration of the motor 111 is the same as that of the motor 11 in the first embodiment. For example, the motor 111 includes a motor shaft 121 which is disposed along the central axis J which extends in the axial direction, a rotor 120 which is provided outward from the motor shaft 121 in the radial direction and is rotatable together with the motor shaft 121, and a stator 130 which is disposed outward from the rotor 120 in the radial direction with a gap.

The cooling unit 180 of the embodiment includes the oil pump 150 instead of the electric oil pump 50 of the first embodiment. The cooling unit 180 of the embodiment includes the water pump 170 instead of the electric water pump 70 of the first embodiment. The oil pump 150 discharges the oil suctioned from a first suction port 181 from a first discharge port 182 by rotation. The water pump 170 discharges the cooling water suctioned from a second suction port 183 from a second discharge port 184 by rotation. The oil cooler 160 performs heat exchange between the oil suctioned from the first suction port 181 and the cooling water suctioned from the second suction port 183. The pump motor 186 drives the oil pump 150 and the water pump 170. Specifically, the pump motor 186 rotates the oil pump 150 and the water pump 170.

Instead of the configuration in which the oil pump 150 and the water pump 170 are driven by the pump motor 186, the oil pump 150 and the water pump 170 may be driven by the motor 111.

The oil cooler 160 is disposed between the oil pump 150 and the water pump 170. In the cooling unit 180, the components are arranged and disposed in the order of the pump motor 186, the water pump 170, the oil cooler 160, and the oil pump 150. A rotation shaft 187 of the pump motor 186 is disposed to pass through the water pump 170. The rotation shaft 187 of the pump motor 186 is disposed to pass through the oil cooler 160. The rotation shaft 187 is coaxial with a rotation axis of the water pump 170 and a rotation axis of the oil pump 150. The water pump 170 and the oil pump 150 are rotated by rotation of the rotation shaft 187 of the pump motor 186.

In the cooling unit 180, the components may be arranged and disposed in the order of the water pump 170, the oil cooler 160, the oil pump 150, and the pump motor 186. In this case, the rotation shaft 187 of the pump motor 186 is disposed to pass through the oil pump 150. The rotation shaft 187 passes through the oil pump 150. A tip end portion of the rotation shaft 187 on the other side (the −Z direction) in the vertical direction may be configured not to pass through the oil pump 150 and to stay in the oil pump 150.

The motor 111 generates heat as it is driven. The oil pump 150 supplies oil, which is a refrigerant for cooling the motor 111, to the motor 111. Specifically, the oil pump 150 circulates the oil as a refrigerant through a circulation path in the oil pump 150, the oil cooler 160, and the housing 110 by the rotation of the pump motor 186. Since the refrigerant circulated by the oil pump 150 is the oil, the motor 111 can be cooled while lubrication is performed in driving of the motor 111.

The oil which is a refrigerant for cooling the motor 111 is suctioned into the oil pump 150 from the first suction port 181 by the driving of the oil pump 150. A filter 185 is provided in the first suction port 181. Although it is assumed that contaminants will be mixed in the oil in the housing 110, the mixing of the contaminants into the oil pump 150 can be prevented by providing the filter 185 at the first suction port 181. The oil suctioned from the first suction port 181 is discharged from a first discharge port 182 via the oil pump 150 and the oil cooler 160 by the driving of the oil pump 150.

A motor driving inverter (not shown) which drives the motor 111 generates heat as the motor 111 is driven. The water pump 170 supplies the cooling water, which is a refrigerant for cooling the motor driving inverter, to the motor driving inverter. Specifically, the cooling water as a refrigerant is circulated through a circulation path of a radiator (not shown), the motor driving inverter, the water pump 170 and the oil cooler 160 by the driving of the water pump 170. Since the refrigerant circulated by the water pump 170 is, for example, the cooling water which is a coolant, the motor driving inverter can be efficiently cooled by the cooling water cooled by the radiator. In addition, the cooling water as a refrigerant may be circulated through a circulation path of the radiator (not shown), the water pump 170, and the oil cooler 160 by the driving of the water pump 170.

The oil cooler 160 is a heat exchanger in which heat exchange between the oil circulated by the oil pump 150 and the cooling water circulated by the water pump 170 is performed. The radiator is located in the circulation path of the cooling water circulated by the water pump 170, and the cooling water is cooled by the radiator. The oil cooler 160 cools the oil circulated by the oil pump 150 with the cooling water cooled by the radiator.

Third Embodiment

<Cooling Unit>

Figure 5:
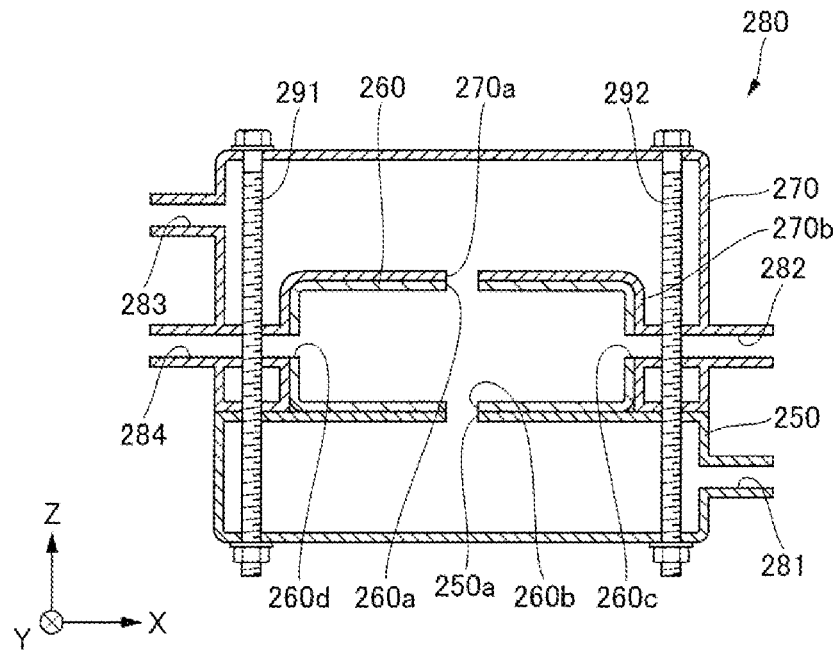
FIG. 5 is a schematic perspective view of a cooling unit according to a third embodiment.

FIG. 5 is a schematic side cross-sectional view of a cooling unit according to a third embodiment. FIG. 5 is a cross-sectional view taken along a plane orthogonal to the central axis J at positions of each of suction ports and each of discharge ports of the cooling unit 280. In the embodiment, components other than the cooling unit are the same as those of the first embodiment, and thus description of the configuration other than the cooling unit will be omitted. The cooling unit 280 includes an electric oil pump 250, an oil cooler 260, and an electric water pump 270. The electric oil pump 250 is a pump which is operated by receiving the supply of power (not shown). The electric water pump 270 is a pump which is operated by receiving the supply of power (not shown). In FIG. 5, illustration of internal configurations of the electric oil pump 250, the oil cooler 260, and the electric water pump 270 is omitted. In the oil cooler 260, a flow path of the cooling water is a flow path different from that of the oil, and the cooling water and the oil do not mix with each other.

The cooling unit 280 of the embodiment includes an electric oil pump 250 instead of the electric oil pump 50 of the first embodiment. The cooling unit 280 of the embodiment includes an electric water pump 270 instead of the electric water pump 70 of the first embodiment. The cooling unit 280 of the embodiment includes an oil cooler 260 instead of the oil cooler 60 of the first embodiment.

The electric oil pump 250 discharges the oil suctioned from a first suction port 281 from a first discharge port 282 by driving. The electric water pump 270 discharges the cooling water suctioned from a second suction port 283 from a second discharge port 284 by driving. The oil cooler 260 performs heat exchange between the oil suctioned from the first suction port 281 and the cooling water suctioned from the second suction port 283. The electric oil pump 250 has the first suction port 281. The electric water pump 270 has the first discharge port 282, the second suction port 283, and the second discharge port 284.

The electric water pump 270 has a concave portion 270b corresponding to a form of the oil cooler 260 on a surface thereof which faces the oil cooler 260. The oil cooler 260 is accommodated in the concave portion 270b. The electric water pump 270, the oil cooler 260, and the electric oil pump 250 are fastened by bolts 291 and 292 which are fastening parts. In FIG. 5, two fastening parts including the bolt 291 and the bolt 292 are shown, but the number of fastening parts may be one or three or more.

The electric oil pump 250 has a third discharge port 250a which discharges the oil suctioned from the first suction port 281 to the oil cooler 260. The oil cooler 260 has a first inflow port 260b into which the oil from the third discharge port 250a flows. The electric water pump 270 has a fourth discharge port 270a which discharges the cooling water suctioned from the second suction port 283 to the oil cooler 260. The oil cooler 260 has a second inflow port 260a into which the cooling water from the fourth discharge port 270a flows.

The electric water pump 270, the oil cooler 260, and the electric oil pump 250 are positioned by fastening the electric water pump 270, the oil cooler 260, and the electric oil pump 250 with the bolts 291 and 292. Positions of the fourth discharge port 270a and the second inflow port 260a are aligned by fastening the electric water pump 270, the oil cooler 260, and the electric oil pump 250 with the bolts 291 and 292. Positions of the first inflow port 260b and the third discharge port 250a are aligned by fastening the electric water pump 270, the oil cooler 260, and the electric oil pump 250 with the bolts 291 and 292.

The oil cooler 260 has a first outflow port 260c through which the oil flowing in from the first inflow port 260b flows out. The oil cooler 260 has a second outflow port 260d through which the cooling water flowing in from the second inflow port 260a flows out. Positions of the first outflow port 260c and the first discharge port 282 are aligned by fastening the electric water pump 270, the oil cooler 260, and the electric oil pump 250 with the bolts 291 and 292. Positions of the second outflow port 260d and the second discharge port 284 are aligned by fastening the electric water pump 270, the oil cooler 260, and the electric oil pump 250 with the bolts 291 and 292.

A space between the fourth discharge port 270a and the second inflow port 260a is sealed and liquid leakage can be prevented by fastening the electric water pump 270, the oil cooler 260, and the electric oil pump 250 with the bolts 291 and 292. A seal member may be provided between the fourth discharge port 270a and the second inflow port 260a. A space between the first inflow port 260b and the third discharge port 250a is sealed and liquid leakage can be prevented by fastening the electric water pump 270, the oil cooler 260, and the electric oil pump 250 with the bolts 291 and 292. A seal member may be provided between the first inflow port 260b and the third discharge port 250a.

Instead of the configuration in which the concave portion 270b which accommodates the oil cooler 260 is provided in the electric water pump 270, a concave portion (not shown) corresponding to the form of the oil cooler 260 may be provided in a surface of the electric oil pump 250 which faces the oil cooler 260.

Further, in the configuration of FIG. 5, like the water pump 170 of FIG. 3, a pump which is operated by external power (for example, the rotation of the pump motor) may be used instead of the electric water pump 270. Further, in the configuration of FIG. 5, like the oil pump 150 of FIG. 3, a pump which is operated by external power (for example, the rotation of the pump motor) may be used instead of the electric oil pump 250.

Fourth Embodiment

<Cooling Unit>

Figure 6:
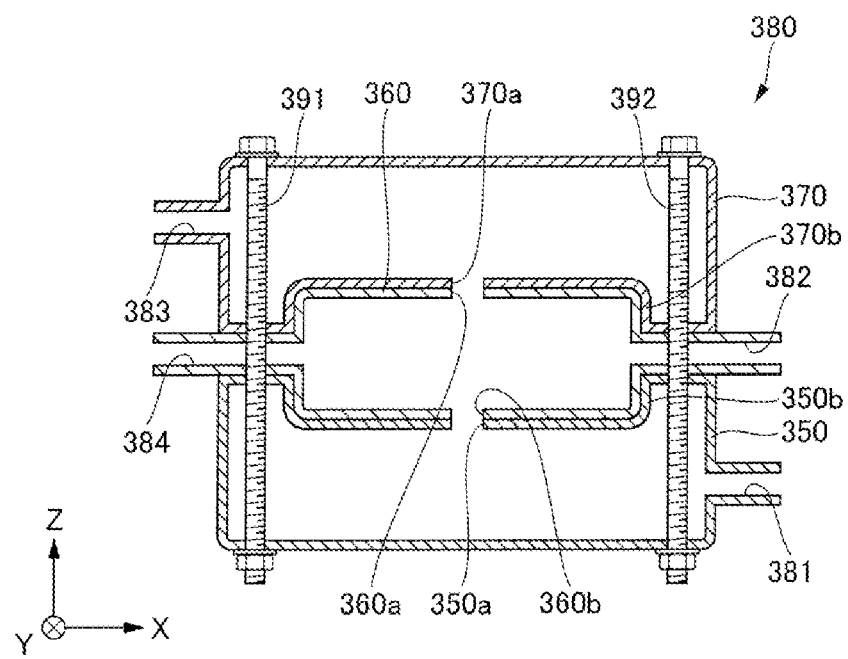
FIG. 6 is a schematic perspective view of a cooling unit according to a fourth embodiment.

FIG. 6 is a schematic side cross-sectional view of a cooling unit according to a fourth embodiment. FIG. 6 is a cross-sectional view taken along a plane orthogonal to the central axis J at positions of each of suction ports and each of discharge ports of the cooling unit 380. In the embodiment, components other than the cooling unit are the same as those of the first embodiment, and thus description of the configuration other than the cooling unit will be omitted. The cooling unit 380 includes an electric oil pump 350, an oil cooler 360, and an electric water pump 370. The electric oil pump 350 is a pump which is operated by receiving the supply of power (not shown). The electric water pump 370 is a pump which is operated by receiving the supply of power (not shown). In FIG. 6, the internal configurations of the electric oil pump 350, the oil cooler 360, and the electric water pump 370 are not shown. In the oil cooler 360, a flow path of the cooling water is a flow path different from that of the oil, and the cooling water and the oil are not mixed with each other.

The cooling unit 380 of the embodiment includes the electric oil pump 350 instead of the electric oil pump 50 of the first embodiment. The cooling unit 380 of the embodiment includes the electric water pump 370 instead of the electric water pump 70 of the first embodiment. The cooling unit 380 of the embodiment includes the oil cooler 360 instead of the oil cooler 60 of the first embodiment.

The electric oil pump 350 discharges the oil suctioned from a first suction port 381 from a first discharge port 382 by driving. The electric water pump 370 discharges the cooling water suctioned from a second suction port 383 from a second discharge port 384 by driving. The oil cooler 360 performs heat exchange between the oil suctioned from the first suction port 381 and the cooling water suctioned from the second suction port 383. The electric oil pump 350 has the first suction port 381. The electric water pump 370 has the second suction port 383. The oil cooler 360 has the first discharge port 382 and the second discharge port 384.

The electric water pump 370 has a concave portion 370b corresponding to a form of the oil cooler 360 in a surface thereof which faces the oil cooler 360. The electric oil pump 350 has a concave portion 350b corresponding to the form of the oil cooler 360 in a surface thereof which faces the oil cooler 360. An end portion of the oil cooler 360 on one side in the vertical direction (the +Z direction) fits into the concave portion 370b. An end portion of the oil cooler 360 on the other side in the vertical direction (−Z direction) fits into the concave portion 350b.

The electric water pump 370, the oil cooler 360, and the electric oil pump 350 are fastened by a bolt 391 and a bolt 392 which are fastening parts. In FIG. 6, two fastening parts including the bolt 391 and the bolt 392 are shown, but the number of fastening parts may be one or three or more.

The electric oil pump 350 has a third discharge port 350a which discharges the oil suctioned from the first suction port 381 to the oil cooler 360. The oil cooler 360 has a first inflow port 360b into which the oil from the third discharge port 350a flows. The electric water pump 370 has a fourth discharge port 370a which discharges the cooling water suctioned from the second suction port 383 to the oil cooler 360. The oil cooler 360 has a second inflow port 360a into which the cooling water from the fourth discharge port 370a flows.

The electric water pump 370, the oil cooler 360, and the electric oil pump 350 are positioned by fastening the electric water pump 370, the oil cooler 360, and the electric oil pump 350 with the bolts 391 and 392. Positions of the fourth discharge port 370a and the second inflow port 360a are aligned by fastening the electric water pump 370, the oil cooler 360, and the electric oil pump 350 with the bolts 391 and 392. Positions of the first inflow port 360b and the third discharge port 350a are aligned by fastening the electric water pump 370, the oil cooler 360, and the electric oil pump 350 with the bolts 391 and 392.

A space between the fourth discharge port 370a and the second inflow port 360a is sealed and liquid leakage can be prevented by fastening the electric water pump 370, the oil cooler 360, and the electric oil pump 350 with the bolts 391 and 392. A seal member may be provided between the fourth discharge port 370a and the second inflow port 360a. A space between the first inflow port 360b and the third discharge port 350a is sealed and liquid leakage can be prevented by fastening the electric water pump 370, the oil cooler 360, and the electric oil pump 350 with the bolts 391 and 392. A seal member may be provided between the first inflow port 360b and the third discharge port 350a.

Further, in the configuration of FIG. 6, like the water pump 170 of FIG. 3, a pump which is operated by external power (for example, the rotation of the pump motor) may be used instead of the electric water pump 370. Further, in the configuration of FIG. 6, like the oil pump 150 of FIG. 3, a pump which is operated by external power (for example, the rotation of the pump motor) may be used instead of the electric oil pump 350.

Figure 7:
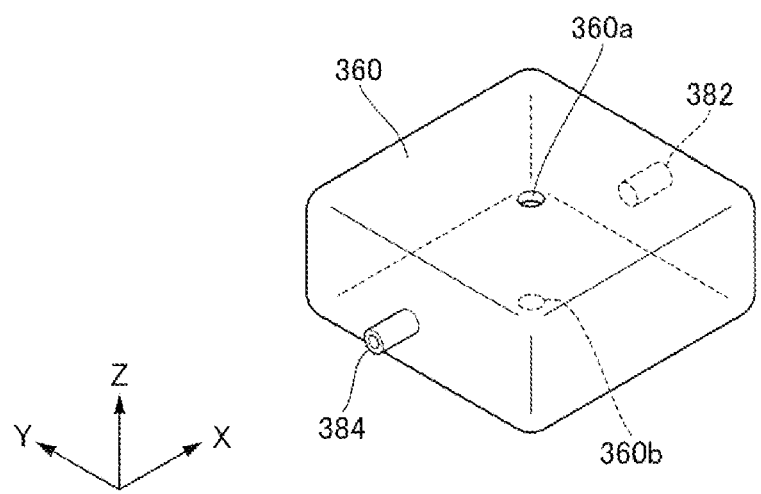
FIG. 7 is a schematic perspective view of an oil cooler of FIG. 6.
Figure 8:
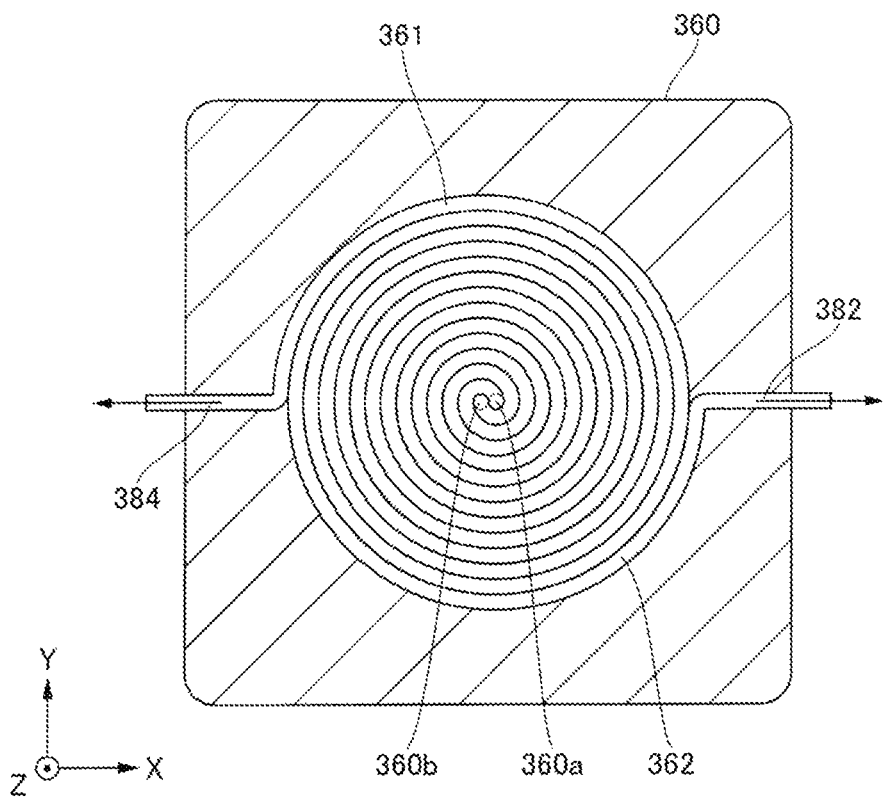
FIG. 8 is a schematic cross-sectional view of the oil cooler of FIG. 7 on a plane orthogonal to a vertical direction Z at positions of a first discharge port and a second discharge port.

FIG. 7 is a schematic perspective view of the oil cooler 360 of FIG. 6. FIG. 8 is a schematic cross-sectional view of the oil cooler 360 of FIG. 7 on a plane orthogonal to the vertical direction Z at positions of the first discharge port 382 and the second discharge port 384. The oil cooler 360 has a cooling water flow path 361 which is a flow path through which the cooling water flows. The oil cooler 360 has an oil flow path 362 which is a flow path through which the oil flows.

The cooling water flow path 361 starts from the second inflow port 360a provided substantially at a center of the oil cooler 360 in a plane orthogonal to the vertical direction Z, turns counterclockwise in FIG. 8, moves away from the center as it turns and reaches the second discharge port 384. The oil flow path 362 starts from the first inflow port 360b provided substantially at the center of the oil cooler 360 in a plane orthogonal to the vertical direction Z, turns counterclockwise in FIG. 8, moves away from the center as it turns and reaches the first discharge port 382. The cooling water flow path 361 is a part of a flow path (a second flow path) through which the cooling water circulates. The oil flow path 362 is a part of a flow path (a first flow path) through which the oil circulates.

The cooling water flow path 361 is adjacent to the oil flow path 362. A direction in which the cooling water flows through the cooling water flow path 361 is counterclockwise in FIG. 8. A direction in which the oil flows through the oil flow path 362 is counterclockwise in FIG. 8. The direction in which the cooling water flows through the cooling water flow path 361 is the same as the direction in which the oil flows through the oil flow path 362.

The cooling water flow path 361 and the oil flow path 362 have a vortex shape. The cooling water flow path 361 and the oil flow path 362 may have a spiral shape which moves away from a center as it turns and proceeds in the vertical direction (the Z direction).

<Operation and Effect of Motor Unit>

Next, an operation and an effect of the motor unit will be described.

(1) In the disclosure according to the above-described embodiment, the motor unit 1 includes the cooling unit 80, the cooling unit 80 suctions and discharges the oil (the first refrigerant) which cools the motor 11 and suctions and discharges the cooling water (the second refrigerant) which cools the oil. Thus, since it is not necessary to prepare a separate configuration for supplying the cooling water, and a man-hour for assembling the configuration for supplying the cooling water is not required separately from a man-hour for assembling motor unit, a man-hour in assembling can be reduced. Further, it is possible to provide the motor unit 1 which can cool the motor driving inverter and can be reduced in size by circulating the cooling water through the motor driving inverter which drives the motor 11.

(2) Further, the cooling unit 80 includes the electric oil pump 50 and the electric water pump 70. Since the electric oil pump 50 and the electric water pump 70 allow the oil and the cooling water to flow, it is not necessary to separately prepare a configuration for supplying the cooling water, and since the man-hour for assembling the configuration for supplying the cooling water is not required separately from the man-hour for assembling the motor unit 1, the man-hour in assembling can be reduced.

(3) Further, the oil cooler 60 is disposed between the electric oil pump 50 and the electric water pump 70. Thus, the pipe between the electric oil pump 50 and the oil cooler 60 and the pipe between the electric water pump 70 and the oil cooler 60 can be eliminated or shortened.

(4) Further, Since the electric oil pump 250, the electric water pump 270 and the oil cooler 260 can be positioned, and the cooling unit 280 can be sealed by fastening the electric oil pump 250 and the electric water pump 270 with the bolt 291 and the bolt 292 (the fastening parts) while disposing the oil cooler 260 in the concave portion 270b, the leakage of the oil and the cooling water in the cooling unit 280 can be prevented.

(5) Further, the number of components can be reduced by driving the oil pump 150 and the water pump 170 with a common pump motor 186.

(6) Further, since the rotation shaft 187 of the pump motor 186, the rotation shaft of the oil pump 150, and the rotation shaft of the water pump 170 are coaxial with each other, a driving force of the pump motor 186 can be transmitted to the oil pump 150 and the water pump 170 with reduced loss, and the cooling unit 180 can be reduced in size in the radial direction of the rotation shaft 187 of the pump motor 186.

(7) Further, since the configuration described in (4) can be applied to the oil pump 150 and the water pump 170, the oil pump 150, the water pump 170, and the oil cooler 160 can be positioned, and the cooling unit 180 can be sealed. Accordingly, the leakage of the oil and the cooling water in the cooling unit 180 can be prevented.

(8) Further, the oil can be reused and the motor 11 can be efficiently cooled by circulating the oil while performing heat exchange in the first flow path. Furthermore, it is possible to prevent foreign matters so-called contaminants generated in the motor 11 from flowing into the cooling unit 80 by providing the filter 85 between the motor 11 and the first suction port 81.

(9) Further, the cooling water can be reused and the oil can be efficiently cooled by the cooling water by circulating the cooling water while performing heat exchange in the second flow path.

(10) Further, in the oil cooler 360, since the direction in which the oil flows and the direction in which the cooling water flows are the same direction, the oil which has passed through the motor 11 and is in a high temperature state can be cooled with the cooling water in a low temperature state from a radiator, and the oil in the oil cooler 360 can be efficiently cooled with the cooling water.

(11) Further, in the oil cooler 360, since the cooling water flow path 361 and the oil flow path 362 have a vortex shape or a spiral shape, it is possible to ensure a long distance for heat exchange between the oil and the cooling water. Accordingly, heat exchange between the oil and the cooling water can be performed efficiently in the oil cooler 360.

(12) Further, since the first refrigerant is the oil, the motor can be cooled while lubrication is performed in driving of the motor. Furthermore, since the second refrigerant is, for example, the cooling water which is the coolant, the oil and the motor driving inverter can be efficiently cooled with the cooling water cooled by the radiator.

The use of the motor unit of the above-described embodiment is not particularly limited. The motor unit of the above-described embodiment is mounted in a vehicle, for example. Moreover, each of the above-described configurations can be suitably combined in the range which is not mutually contradictory.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A motor unit comprising:
a motor having a motor shaft disposed along a central axis which extends in an axial direction;
a housing that accommodates the motor; and
a cooling unit which cools the motor,
wherein the cooling unit comprises:
a first suction port, configured to suction a first refrigerant which cools the motor;
a first discharge port, configured to discharge the first refrigerant suctioned from the first suction port;
a second suction port, configured to suction a second refrigerant which cools the first refrigerant by exchanging heat with the first refrigerant;
a second discharge port, configured to discharge the second refrigerant suctioned from the second suction port,
a heat exchanger, configured to perform heat exchange between the first refrigerant suctioned from the first suction port and the second refrigerant suctioned from the second suction port,
wherein the heat exchanger is disposed outside of the housing,
the first suction port and the first discharge port are disposed to face an inside of the housing,
at least one of the second suction port or the second discharge port is disposed to protrude from the heat exchanger.

2. The motor unit according to claim 1, wherein the cooling unit comprises:
a first electric pump, configured to discharge the first refrigerant suctioned from the first suction port from the first discharge port; and
a second electric pump, configured to discharge the second refrigerant suctioned from the second suction port from the second discharge port.

3. The motor unit according to claim 2, wherein the heat exchanger is disposed between the first electric pump and the second electric pump.

4. The motor unit according to claim 2, wherein the first electric pump or the second electric pump comprises a concave portion configured to fit the heat exchanger, and
a fastening portion which fastens the first electric pump and the second electric pump at a position in which the concave portion is disposed between the first electric pump and the second electric pump is further included.

5. The motor unit according to claim 1, wherein the cooling unit comprises:
a first pump, configured to discharge the first refrigerant suctioned from the first suction port from the first discharge port;
a second pump, configured to discharge the second refrigerant suctioned from the second suction port from the second discharge port; and
a pump motor, configured to drive the first pump and the second pump.

6. The motor unit according to claim 5, wherein
the first pump discharges the first refrigerant suctioned from the first suction port from the first discharge port by rotation,
the second pump discharges the second refrigerant suctioned from the second suction port from the second discharge port by rotation,
the heat exchanger is disposed between the first pump and the second pump,
a rotation shaft of the pump motor is disposed to pass through the heat exchanger,
the rotation shaft of the pump motor is coaxial with a rotation axis of the first pump and a rotation axis of the second pump, and
the first pump and the second pump are rotated by rotation of the rotation shaft of the pump motor.

7. The motor unit according to claim 5, wherein
the first pump or the second pump comprises a concave portion configured to fit the heat exchanger, and
a fastening portion which fastens the first pump and the second pump at a position in which the concave portion is disposed between the first pump and the second pump is further included.

8. The motor unit according to claim 2, wherein
the first refrigerant circulates and flows through a first flow path,
the first flow path is a flow path configured to extend from the motor to the first suction port and to extend from the first discharge port to the motor through the heat exchanger, and
a filter is provided between the motor in the first flow path and the first suction port.

9. The motor unit according to claim 8, wherein
the second refrigerant circulates and flows through a second flow path, and the second flow path is a flow path configured to extend from a motor driving inverter which drives the motor to the second suction port and to extend from the second discharge port to a radiator through the heat exchanger.

10. The motor unit according to claim 9, wherein a direction in which the first refrigerant in the first flow path flows in the heat exchanger is the same as a direction in which the second refrigerant in the second flow path flows in the heat exchanger.

11. The motor unit according to claim 10, wherein the first flow path and the second flow path have a vortex shape or a spiral shape in the heat exchanger.

12. The motor unit according to claim 1, wherein
the first refrigerant is oil, and
the second refrigerant is cooling water.

13. The motor unit according to claim 1, wherein the heat exchanger is disposed outside of the housing in a radial direction of the housing.

* * * * *